Patented May 5, 1953

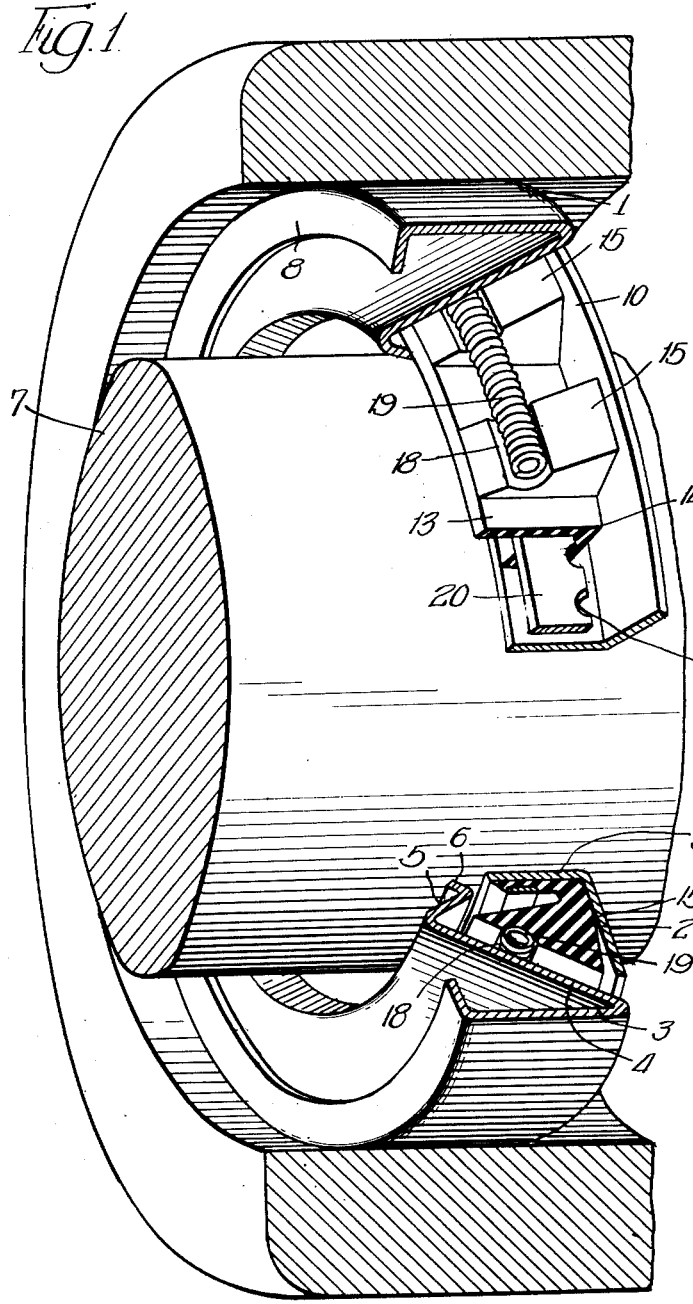
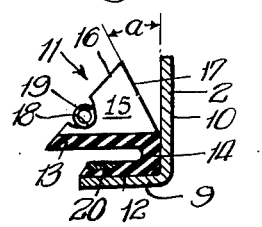
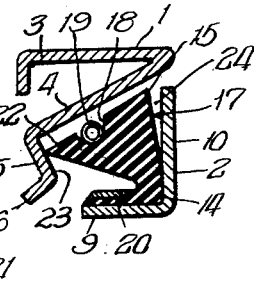
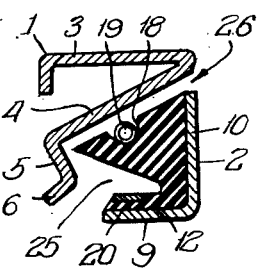

2,637,574

UNITED STATES PATENT OFFICE 2,637,574

FLUID SEAL

Karl L. Diehl, Chicago, Ill., assignor to Victor Manufacturing & Gasket Co., Chicago, Ill., a corporation of Illinois Application March 24, 1950, Serial No. 151,744

7 Claims. (Cl. 286—11.11)

1

This invention relates to fluid sealing devices, and more particularly to a sealing device for use in machinery of all kinds to prevent passage of fluid along a rotating shaft which extends through a relatively stationary member, and has for its principal object the provision of a new and improved device of this kind.

A main object of this invention is to provide an efficient sealing device which seals a stationary or slowly rotating shaft by physical contact and which seals efficiently at higher shaft speeds without physical contact between the rotating shaft and stationary member.

A further object of this invention is to provide an improved device for sealing the space between a rotatable shaft and a stationary member through it extends, in which device a sealing element is in positive sealing engagement with a stationary surface when the shaft is stationary or rotating below a critical speed and in which a sealing element is moved out of said engagement by centrifugal force and combines with a conical slinger type seal to create a fluid turbulence at the device to prevent the passage of fluid along the shaft when the shaft is rotating above the critical speed.

A further object of this invention is to provide an improved device which combines positive contact sealing action and centrifugal slinger sealing action to prevent the flow of fluid along a shaft extending through a bore in a stationary member and which device does not require special configuration of the stationary member for installation and operation.

A further object of this invention is to provide a combination positive action and centrifugal slinger action sealing device which can be manufactured at low cost without sacrificing quality.

Further objects of the invention not specifically mentioned here will be apparent from the detailed description and claims which follow, reference being had to the accompanying drawings in which Fig. 1 is a view in isometric projection showing the seal applied to a shaft, with certain parts cut away the better to show the invention;

Fig. 2 is a cross sectional view taken on a radius through the rotating member of the seal, drawn to an enlarged scale, showing the sealing element positioned in the rotating shell;

Fig. 3 is a cross sectional view taken on a radius through the seal, drawn to an enlarged scale and showing the position assumed when the shaft is at rest or rotating slowly; and Fig. 4 is a view similar to Fig. 3, showing the

2 position of the seal when the shaft is rotating at high speed.

Seals designed to prevent the escape of a fluid through the space between a rotating shaft and the supporting member through which it projects, generally consist of either a metal case with a leather or rubberlike sealing diaphragm enclosed therein and adapted to sealingly engage the shaft under pressure to prevent passage of fluid therealong or cooperating non-contacting flanges which act through centrifugal force to sling the fluid from the shaft and effect a seal between the members. Each of these sealing devices involve certain drawbacks. The seals which contact the shaft necessarily produce a frictional drag on the shaft and the heat generated by the friction causes wear of the sealing element and limits the life of the seal. This is particularly true when such a seal is used with high speed shafts. The slinger type possesses the drawback that it cannot be used where the shaft is partly submerged in the fluid as it will not function when the shaft is idle or rotating slowly.

In the prior art of which I am aware, attempts have been made to combine the desirable features of the two types of seals in a single sealing device devoid of the drawbacks of the individual types. These include devices which combine the positive sealing action of the sealing diaphragm for low shaft speeds, and the frictionless slinger type seal action for high speeds. By such a combination, a single seal device can seal a submersed shaft while stationary or rotating slowly by positive seal action, and can seal the shaft at high speeds without any frictional contact between the rotating and stationary members.

The prior art of my knowledge has not been altogether successful in combining these two sealing principles. These devices have all required that the housing surrounding the shaft be formed to a special configuration to coact with the sealing devices. The seals produced are not independent devices which can be installed in standard or common shaft and housing designs. These prior art devices are further unsatisfactory in that the required housing configurations are expensive to form, usually requiring special casting and machining to produce.

It is to provide a combination seal of this type as an independent device capable of being installed in standard shaft and bore designs, and which is economical to manufacture, that this invention is principally directed.

Referring now to the drawings in more detail: The sealing device of the present invention consists of a stationary shell 1 and a rotating shell 2 which are preferably composed of metal. Stationary shell 1 comprises an annulus generally Z-shaped in cross section, having an outer cylindrical wall 3, from one end of which a frusto-conical flange 4 projects radially inwardly toward the shaft and terminates in a re-entrant frusto-conical flange 5 projecting diagonally inwardly in the direction opposite flange 4 and which in turn terminates in a short radial flange 6 that is substantially parallel to flange 4 and which terminates on an aperture whose diameter is slightly larger than the shaft 7 being sealed. The outside diameter of cylindrical wall 3 is slightly larger than the diameter of the bore being sealed thereby to provide a fluid-tight press fit when shell 1 is inserted in a housing. A short radial flange 8 projects radially inwardly from the opposite end of cylindrical wall 3 to reinforce the cylindrical wall and to provide a flat surface that facilitates pressing the shell into a bore in a housing.

The rotating shell 2 consists of a cylindrical wall 9, having a diameter slightly less than the diameter of the shaft to be sealed, from one end of which a flat annular wall 10 projects radially outwardly, the diameter of this wall being less than the diameter of the bore in the housing being sealed.

As shown in Fig. 2, the sealing element 11, preferably composed of an elastomer, consists of a cylindrical base flange 12 connected to a cylindrical diaphragm 13 by a radial neck 14. A plurality of spaced-apart wedge-shaped lugs 15 extend radially outwardly from the outer surface of the diaphragm 13 with conical faces 16 substantially parallel to flange 4 of stationary shell 1 and flat faces 17 inclined toward and defining an acute angle $a$ with radial wall 10 of shell 2. Grooved recesses 18 in faces 16 form a channel adapted to receive a suitable tension spring 19.

Sealing element 11 is immovably secure to rotating channel 2 preferably by chemically bonding base 12 to cylindrical wall 9 and the innermost portion of radial wall 10. Cylindrical metal ring 20, containing a plurality of spaced-apart cutouts 21 (Fig. 1), is molded within base 12 of the sealing element to reinforce the sealing element and further anchor it to channel 2.

In installing the sealing device, the rotating channel 2 is pressed onto shaft 7 in a fluid-tight engagement and with radial wall 10 toward the reservoir of fluid to be sealed. Stationary shell 1 is then pressed into the bore of the housing until sealing lip 22 of diaphragm 13 engages outer face 23 of flange 5. As shown in Fig. 3, when the shaft is at rest or rotating slowly, tension spring 19, acting on lugs 15, presses diaphragm 13 radially inwardly maintaining the sealing engagement of lip 22 and face 23. The dimensions of spring 19 must be such that it will maintain the sealing contact between lip 22 and flange 5 at shaft speeds below the critical speed at which the centrifugal slinger action of the seal will not operate efficiently.

When the shaft is stationary or rotating below the critical speed, the positive sealing action of lip 22 in contact with flange 5 prevents the flow of fluid out of the housing along the shaft. As the speed of shaft 7 approaches the critical speed, centrifugal force acting on diaphragm 13, lugs 15, and spring 19, opposes the tension of spring 19. At the critical speed, the tension of spring 19 is overcome by centrifugal force and diaphragm 13 is flung radially outwardly by the centrifugal force acting on the diaphragm 13 and lugs 15. As the diaphragm 13 is flung outwardly, sealing lip 22 is lifted from flange 5 breaking the positive sealing action.

As shown in Fig. 3, at shaft speeds above the critical speed, the centrifugal force acting on sealing element 11 causes the element to assume a position wherein radial faces 17 of lugs 15 abut wall 10 and the rotating and stationary members are separated by a substantially S-shaped channel indicated generally at 25. At such shaft speeds, the outward faces of lugs 15 and diaphragm 13 act as centrifugal slingers imparting centrifugal force to the fluid entering channel 25, which force flings the fluid outwardly against the conical surface of the inwardly projecting conical flange 4 of the stationary shell 1. As the fluid is flung outwardly against flange 4, a fluid turbulence is created in channel 25 and immediately adjacent the reservoir side 26 of channel 25 which prevents the flow of fluid through the channel and thereby effectively prevents the passage of fluid past the device without physical contact between the stationary and rotating members.

As the rotation of the shaft decreases below the critical speed, the centrifugal force acting on diaphragm 13 and lugs 15 decreases until it no longer counters the tension of spring 19, and the elastic forces of the diaphragm and the spring press the diaphragm back into engagement with flange 5 and the sealing operation is obtained by the positive contact action, as heretofore described. The shaft speed at which the diaphragm is engaged or disengaged is determined by the tension of spring 19 and the elasticity of the material of the sealing element. The dimension of spring 19 must be such as to produce sufficient tension in the spring to hold the diaphragm in positive sealing position at all shaft speeds below which the frictionless slinger action does not create a sufficient fluid turbulence to prevent the flow of fluid through channel 25. The critical speed will vary depending upon the fluid being sealed, fluid temperature, and other operating factors, and thus it is contemplated that springs of various tensions will be necessary to adapt the instant invention to the particular sealing situation in which it is to be employed. It is also contemplated that the sealing element may be made of a material with high specific gravity and high elongation to increase the effect of centrifugal force thereon, thereby to reduce the critical speed at which the frictionless operation of the seal commences to operate.

The seal of the present invention possesses many advantages. The shifting sealing diaphragm allows the seal to seal a shaft submersed in fluid while the shaft is stationary and rotating slowly, and still obtain highly desirable and efficient frictionless sealing at high shaft speeds. It is comprised of a molded elastomer sealing element and two shells or housings preferably formed by stamping and thus is readily produced economically in machinery standard to the industry. The seal is manufactured as a two-piece unit, does not depend on special configurations of the shaft or shaft openings for its operation, and can readily be installed in standard shaft openings. Because the positive frictional sealing action is only temporary and for short periods, heat build-up and wear are minimized and the life of the seal is greater than those commonly empolyed.

While I have chosen to illustrate my invention by showing and describing preferred embodiments of it, I have done so by way of example only, as there are many modifications and adaptations which can be made by one skilled in the art within the teachings of the invention.

Having thus complied with the statutes, and shown and described a preferred embodiment of my invention, what I consider new and desire to have protected by Letters Patent is pointed out in the appended claims.

What is claimed is:

1. In a device for sealing the space between a rotating shaft and a housing through which the shaft projects; a stationary member sealingly engaging the housing; a rotary member sealingly engaging the shaft and comprising: a metallic member consisting of a cylindrical portion engaging the shaft and an annular member projecting radially outwardly therefrom; an elastomer sealing element consisting of a cylindrical portion bonded to the cylindrical portion of said metallic member, an annulus integral with said cylindrical portion and disposed alongside of the annular portion of said metallic member, and an outer cylindrical portion integral with said annulus and extending therefrom coaxially of said shaft and terminating in a lip-like portion; a spring encircling said outer cylindrical portion and tensioned to urge said lip-like portion into sealing engagement with said stationary member so long as said shaft rotation is below a critical speed; and a plurality of spaced apart wedge-shaped lugs integral with said outer cylindrical member and forming therewith a slinger for setting up fluid turbulence between said stationary member and said rotating member when the shaft is rotating above said critical speed and centrifugal force has deflected said outer cylindrical member against the tension of said spring and out of engagement with said stationary member.

2. A sealing element as claimed in claim 1, in which the cylindrical portion of the elastomer element contains an embedded metallic ring to which the elastomer is also bonded.

3. A sealing element as claimed in claim 1, in which the wedge-shaped lugs contain flat faces disposed adjacent to and at an angle to said metallic annulus and moved into engagement therewith by centrifugal force to limit the deflection of said outer cylindrical elastomer member under said force.

4. A device for sealing the space between a rotatable shaft and a housing through which it extends, comprising: an outer annular shell adapted to be mounted in the housing in fluid-tight engagement therewith, an inwardly extending frusto-conical wall surface of said shell terminating in a second and re-entrant frusto-conical wall surface, an inner annular shell adapted to fit the shaft in fluid-tight engagement and to rotate therewith, a pliant elastic sealing element carried by said inner shell, a flexible cylindrical diaphragm of said element disposed substantially coaxially with said shaft, a lip-like portion of said diaphragm adapted to sealingly engage said re-entrant frusto-conical wall surface, a plurality of spaced-apart wedge-shaped lugs on the outer surface of said diaphragm, spring means carried by said lugs to maintain said sealing lip in sealing contact with said re-entrant wall surface when the shaft is rotating below a critical speed, said diaphragm and spring having such flexibility as to be deflected outwardly by centrifugal force to disengage the sealing contact when the shaft rotates above the critical speed, said diaphragm and lugs when so deflected acting as a slinger and co-acting with the inwardly extending frusto-conical wall surface to create a fluid turbulence therebetween and prevent the flow of fluid along the shaft while so rotating above the critical speed.

5. A device for sealing the space between a rotatable shaft and a housing through which it extends, comprising: an outer annular shell adapted to be mounted in the housing in fluid-tight engagement therewith and having a cylindrical portion, a frusto-conical flange extending inwardly from one edge of said cylindrical portion and terminating in a re-entrant conical flange, an inner annular shell adapted to fit the shaft in fluid-tight engagement and to rotate therewith, a pliant elastic sealing element carried by said inner shell, a flexible cylindrical diaphragm of said sealing element disposed substantially coaxially with said shaft, a lip-like portion of said diaphragm adapted to sealingly engage said re-entrant flange, a plurality of spaced-apart wedge-shaped lugs on the outer surface of said diaphragm, spring means carried by said lugs to maintain the sealing lip in sealing contact with said re-entrant extending flange when the shaft is rotating below a critical speed, said diaphragm and lugs having such flexibility as to be deflected outwardly by centrifugal force to disengage the sealing contact when the shaft rotates above the critical speed, said diaphragm and lugs so deflected acting as a slinger and co-acting with the inwardly extending flange to create a fluid turbulence therebetween and prevent the flow of fluid along the shaft while so rotating above the critical speed.

6. A device for sealing the space between a rotatable shaft and a housing through which it extends, comprising: an outer annular shell adapted to be mounted in the housing in fluid-tight engagement therewith and having a cylindrical portion, a frusto-conical flange extending inwardly from one edge of said cylindrical portion and terminating in a re-entrant conical flange; an inner annular shell adapted to fit the shaft in fluid-tight engagement and to rotate therewith, said shell having a cylindrical portion and a flat radial wall extending outwardly therefrom; a pliant elastic sealing element carried by said inner shell, a flexible cylindrical diaphragm of said sealing element disposed substantially coaxially with said shaft, a lip-like portion of said diaphragm adapted to sealingly engage said re-entrant flange, a plurality of spaced-apart wedge-shaped lugs on the outer surface of said diaphragm, spring means carried by said lugs to maintain the sealing lip in sealing contact with said re-entrant extending flange when the shaft is rotating below a critical speed, said diaphragm and lugs having such flexibility as to be deflected outwardly by centrifugal force to disengage the sealing contact when the shaft rotates above the critical speed, said diaphragm and lugs so deflected acting as a slinger and co-acting with the inwardly extending flange to create a fluid turbulence therebetween and prevent the flow of fluid along the shaft while so rotating above the critical speed.

7. A device for sealing the space between a rotatable shaft and a housing through which it extends, comprising: an outer annular shell adapted to be mounted in the housing in fluid-tight engagement therewith and having a cylindrical portion, a frusto-conical flange extending inwardly from one edge of said cylindrical portion and terminating in a re-entrant conical flange; an inner annular shell adapted to fit the shaft in fluid-tight engagement and to rotate therewith, said shell having a cylindrical portion and a flat radial wall extending outwardly therefrom; a pliant elastic sealing element carried by said inner shell, a flexible cylindrical diaphragm of said sealing element disposed substantially coaxially with said shaft, a lip-like portion of said diaphragm adapted to sealingly engage said re-entrant flange, a plurality of spaced-apart wedge-shaped lugs on the outer surface of said diaphragm, a garter spring carried by said lugs to hold the sealing lip in sealing contact with said re-entrant extending flange when the shaft is rotating below a critical speed, said diaphragm and lugs having such flexibility as to be deflected outwardly by centrifugal force to disengage the sealing contact when the shaft rotates above the critical speed, said diaphragm and lugs so deflected acting as a slinger and co-acting with the inwardly extending flange to create a fluid turbulence therebetween and prevent the flow of fluid along the shaft while so rotating above the critical speed.

KARL L. DIEHL.

References Cited in the file of this patent

UNITED STATES PATENTS

| Number | Name | Date |
| --- | --- | --- |
| 2,009,281 | Stein | July 23, 1935 |
| 2,478,649 | Wightman | Aug. 9, 1949 |

FOREIGN PATENTS

| Number | Country | Date |
| --- | --- | --- |
| 72,860 | Norway | of 1947 |